(12) United States Patent
Moharram et al.

(10) Patent No.: US 7,290,286 B2
(45) Date of Patent: Oct. 30, 2007

(54) CONTENT PROVIDER SECURE AND TRACABLE PORTAL

(75) Inventors: Omayma E. Moharram, Carleton Place (CA); Roch R. Charbonneau, Aylmer (CA)

(73) Assignee: Nortel Networks Limited (CA)

( * ) Notice: Subject to any disclaimer, the term of this patent is extended or adjusted under 35 U.S.C. 154(b) by 696 days.

(21) Appl. No.: 10/115,396

(22) Filed: Apr. 3, 2002

(65) Prior Publication Data

US 2002/0169953 A1 Nov. 14, 2002

Related U.S. Application Data

(60) Provisional application No. 60/289,821, filed on May 10, 2001.

(51) Int. Cl.
*H04L 9/32* (2006.01)

(52) U.S. Cl. .......................................... 726/27; 713/151

(58) Field of Classification Search .................. 726/10, 726/27–30
See application file for complete search history.

(56) References Cited

U.S. PATENT DOCUMENTS

| | | | | |
|---|---|---|---|---|
| 6,223,291 B1 * | 4/2001 | Puhl et al. | ...................... | 726/28 |
| 6,789,188 B1 * | 9/2004 | Epstein et al. | ............... | 713/155 |
| 6,836,765 B1 * | 12/2004 | Sussman | ........................ | 705/75 |
| 6,975,619 B1 * | 12/2005 | Byers et al. | ................. | 370/351 |

OTHER PUBLICATIONS

Malkin, "Traceroute Using an IP Option", Jan. 1993, pp. 1-6, obtained from http://asg.web.cmu.edu/rfc/rfc1393.html.*

"IPSEC outline. RFC2401", Dec. 29, 2001, pp. 1-3, obtained from http://web.archive.org/web/20011229085802/http://people.freebsd.org/~julian/IPSEC_4_Dummies.html.*

Blaze et al., "Trust Management and Network Layer Security Protocols", 1999, pp. 1-6, obtained from http://www1.cs.columbia.edu/~angelos/Papers/networksec.pdf.*

Shwartz et al., "Smart Packets: Applying Active Networks to Network Management", Feb. 2000, pp. 1-22.*

* cited by examiner

*Primary Examiner*—Emmanuel L. Moise
*Assistant Examiner*—Jeffrey D. Popham
(74) *Attorney, Agent, or Firm*—McGuinness & Manaras LLP (57) ABSTRACT

A Content Provider Secure and Traceable Portal (CPSTP) facilitate secure content delivery and accounting for controlled and uncontrolled contents and for small to large content providers. The CPSTP defines security and non-repudiation of users, a secure environment for electronic signature, and trace-ability functions that are critical for commercial and financial transactions of e-Business contents on the integrated optical and wireless Internet. The CPSTP apparatus and functions facilitate and support the rapid growth in commercial and financial transactions for all wireless and wire-line devices capable of communicating on the Internet. The CPSTP functions may be used to provide secure and traceable end-to-end connections over the integrated optical and wireless Internet for all types of content configurations, including Business-to-Consumer (B2C), Business-to-Business (B2B), Consumer-to-Business (C2B), and Consumer-to-Consumer (C2C). The CPSTP couples security and trace functionality in provider's networks and traceability function is originated in the network to tag with the content as it traverse the path to the requested device.

26 Claims, 8 Drawing Sheets

| ASP: | Application Service Provider | IPSEC: | Layer 3 IP Security |
| POP: | Point of Presence | L2TP: | Layer 2 Tunneling Protocol |
| DMZ: | Demilitarized zone | SSL: | Secure Socket Layer |

CONTENT PROVIDER SECURE AND TRACABLE PORTAL

This application claims priority to a previously filed provisional application, Ser. No. 60/289,821, filed May 10, 2001.

BACKGROUND OF THE INVENTION

This invention relates generally to networking and, in particular, to content and application security, traceability and accounting.

As is well known, the Internet is a huge collection of computers networks that are interconnected around the world. These computers are devices that can be switches, gateways, servers or routers. The computers networks are interconnected by the router that routes traffic from a source device (e.g., Web switch) to a destination device (e.g., Web server) passing through some number of intervening networks. The Internet devices have computing abilities and utilize protocols conforming to the open system interconnection (OSI) model of which the transmission control protocol over Internet protocol (TCP/IP) is a widespread implementation. All information transported over the Internet is parcelled into TCP/IP packets, which are routed to an intended destination.

The key technological advance of the Internet is that it allows information, or 'content' and applications to be shared among authorised devices coupled to the network. For the purposes of this application, content and applications that are accessed or provided over the Internet in any business transaction are referred to as electronic business (e-business) content and applications. Examples of e-business content and applications include Internet telephony and facsimile, electronic-mail, electronic-commerce, and electronic-mobile, video-on-demand, data transfer, remote access to business services, and any kind of digitized information for Business-to-Business (B2B), Business-to-Consumer (B2C), Consumer-to-Business (C2B), and Consumer-to-Consumer (C2C).

As Internet use grows, e-business contents and applications increase rapidly for businesses and consumers. Content providers vary in sizes from a single content provider to large organisation; and Content accounting and billing take also various forms, from free downloading, pay per service, pay per access, or others. Due to the size differences and attributes of each of the content providers, there are often a number of different methods by which users must interface with the different providers to obtain content.

For example, one large organisation that provides content may be a publishing company that provides content, such as text or music, for a fee. Subscribers are typically required to register for access to the application prior to accessing the content. The registration would require that the subscriber enter a user identifier and password. When the subscriber registers with the application, data including the subscriber's identifier, address and billing information may be collected so that the subscriber's access can be tracked, and the subscriber can be billed accordingly.

One problem for a subscriber in obtaining e-business content or using e-business applications arises because the security hooks (i.e., user registration and verification) are implemented at the application layer, at the content provider. Different e-business applications often require different format for user identifiers and passwords. In addition, a common e-business content and application provider may have different registration methods for their different applications, thereby adding to the confusion. For example, a bank may require the subscriber to log in separately for access to a bank account or access to a stock trading/investment services. In a worst-case scenario, each application or content request could require a different password or registration procedure. As the number of applications and content made available on the Internet increases, the task of maintaining registration information for each such application is becoming onerous.

A further problem arises for the individual content provider who seeks to furnish content on the Internet, but lacks the tools necessary to provide secure access and accountability over who accesses the content. For example, an individual photographer may seek to publish photographs on the web, but may not have the ability to track all those who download the content. Such individuals are discouraged from using the Internet as their e-commerce tools because they lack the ability to ensure that they are getting adequately compensated for their content.

An additional issue arises with uncontrolled content, where uncontrolled content will mean, for the purposes of this application, content that is not typically accessed using a user identifier and a password. It may be desirable for a provider of uncontrolled content to monitor who is accessing the content for various reasons. The typical tools that have been in place, however, generally trace only for security purposes, and therefore there is no simple way to obtain information regarding the client who accesses your content.

It would be desirable to identify a technique for managing secure, traceable access to Internet content and applications. Such a technique would enable individual, enterprise or small to large Businesses for B2B, B2C, C2B, and C2C services to flourish.

SUMMARY OF THE INVENTION

It is an object of the present invention to provide a new and improved apparatus and functionality for service provider that ensures user security and content trace-ability for Internet content and applications.

According to one aspect of the invention, a device for storing content is described. The device includes a portal, for interconnecting the device to a network. The portal includes a mechanism for automatically retrieving information from a second device coupled to the network in response to a request from the second device for access to the content.

According to a further aspect of the invention, a software program that executes at a network layer protocol on a device is described. The software program controls access to content stored on the device and includes a mechanism for tracing requests, made by a requesting device, for access to the content, and for returning characteristics of the requesting device.

According to another aspect of the invention, a method of controlling access, by a requesting device, to content stored at content providing device includes the following steps: receiving a request for access to the content, determining a characteristic of the requested content and forwarding the requested content to the requesting device in response to the characteristic, and forwarding a trace to the requesting device to retrieve characteristics of the requesting device.

The invention, therefore, according to a first broad aspect provides content providers, ISPs, or large organizations a secure and traceable portal (CPSTP) to the Internet. Because any device coupled to the network may use the CPSTP, the result is a more secure and trace-able environment, which, in turn fosters the growth of e-business applications.

An exemplary operation of the CPSTP will now be described. A content creator (or a service provider) creates a new e-business content and downloads the content via the Internet to the Web server. The content creator makes the content available on the Web server, and consumers with wireless or wireline devices can access the server and request or download the content.

As the consumer receives the content, the CPSTP at the server sends a trace to get the consumer's identifier (e.g., User identifier, IP address, URL, telephone number, cell number, or one of several other supported techniques), of the recipient device. The access device (wireless or wireline) sends an acknowledgement back to the Web server with the consumer's device identifier.

In an additional embodiment of the invention, the CPSTP at the web server may send a template to collect the consumer information for authentication for accounting and billing. The consumer adds his/her signature, (when required, depending on the kind of content), to confirm receipt of the content and execute the billing process. For example, signature may be required for buying or selling stocks while consumer's identifier may be sufficient to get special market data.

The content provider secure and traceable portal (CPSTP) capability facilitates secure content delivery and accounting for controlled and uncontrolled contents and for both small and large content providers for businesses and consumers.

BRIEF DESCRIPTION OF THE DRAWINGS

The invention will be better understood from the following description of a preferred embodiment together with reference to the accompanying drawing, in which.

DETAILED DESCRIPTION

Figure 1:
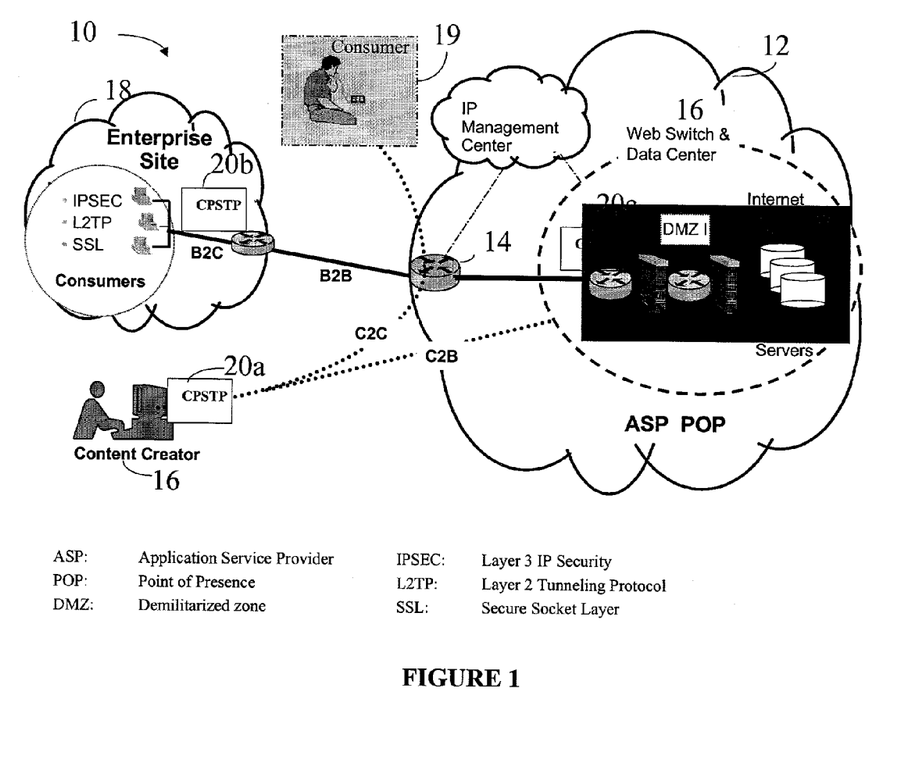
FIG. 1 is a diagram illustrating a network environment in which the present invention may be used.

Referring now to FIG. 1, an Internet network 10 is shown to include a number of devices coupled together via an Application Service Provider (ASP) point of presence (POP) 12. In the embodiment illustrated in FIG. 1, the network 10 may be an Integrated Optical and Wireless network for coupling various wireless and wire-line devices to a content, although it will be seen, from the discussions below, that the present invention is not limited to any particular type of network or communicating device.

The configuration of the Internet network 10 is intended to show a variety of e-business configurations. For example, a Business-to-Business (B2B) configuration is provided between Enterprise site 18 and the ASP POP. A Consumer-to-Business (or alternatively, a Business-to-Consumer) configuration is shown between content creator 16 and the ASP POP 12. A Consumer-to-Consumer configuration exists between Content creator 16 and consumer 19. Although certain switches and devices are illustrated in FIG. 1, it should be understood that the devices that may be coupled into the Internet network 10 hand held PDAs, cell phones, computers or switches, routers, etc., in short any wire-less or wire-line device.

The content creator, such as content creator 16 can be a single person, a dot.com company, or a small, medium, and large service provider (SP) such as Internet SP (ISP), Application SP (ASP), ILEC (Incumbent local exchange carrier), IXC (Inter exchange carrier), and CLEC (Competitive local exchange carrier).

In FIG. 1 a Content Provider Secure and Traceable Portal (CPSTP) 20 is included at various locations in the Internet network, as indicated by numerals 20a, 20b and 20c in FIG. 1. Although it is only shown in some portions of the network, it will quickly become apparent that the CPSTP may function at any point in the network through which content flows, whether it be at the actual content creation point (such as 20a), or at an Enterprise Ingress/Egress point (20b), or at an ASP ingress/egress point (20c).

As will be described in more detail below, the CPSTP allows a base level of security and trace-ability of content in the Internet. The CPSTP can be configured to perform a variety of operations in the areas of security, billing, tracing and notification. For example, these operations include: a security and non-repudiation mechanism that authenticates the business and consumer commercial and financial transactions; an electronic signature capability for consumer authorisation; tracing the content when the consumer requests the content from the Internet content switch (or Web server); monitoring the accounting and manage the billing for the content when the consumer access device identifier (e.g., User identifier, IP address, URL, telephone number, cell number, or one of several other supported techniques) is received in the trace function.

According to one aspect of the invention, the CPSTP utilises existing Internet Protocol (IP) control messages in a novel manner to implement security and trace-ability functions, normally implemented at the application layer in the Internet, at the network layer. In the embodiment described herein particular commands associated with the Internet control message protocol (ICMP) of IP will be described but it is envisioned that the present invention could be extended to other protocols by using protocol commands allocated to similar functions, and therefore the present invention should not be limited to the ICMP protocol.

Figure 2:
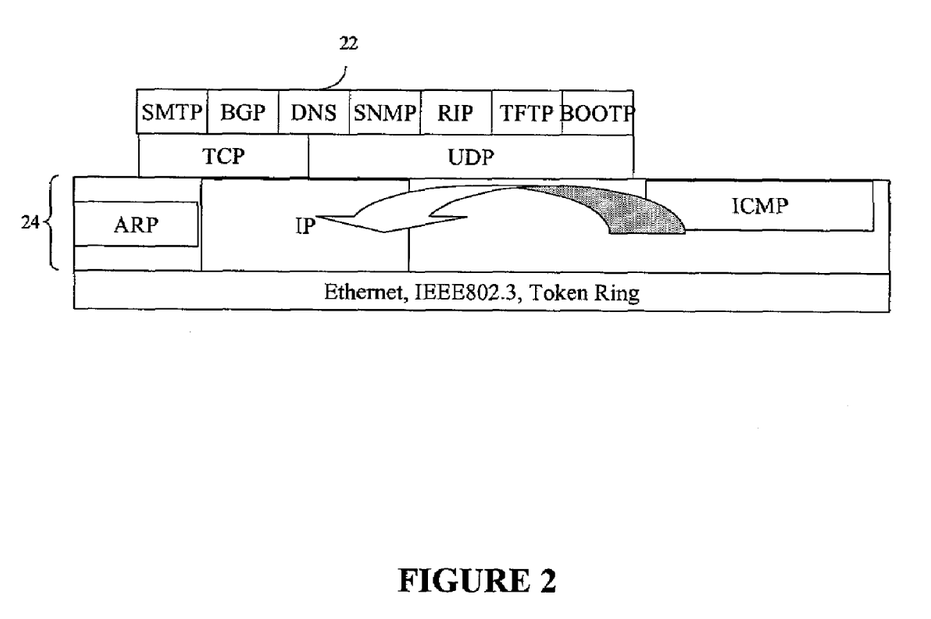
FIG. 2 illustrates the defined data fields in the Internet Protocol (IP) standard, including Internet Connection Messaging Protocol (ICMP) fields.

The Internet Protocol [IP] is not designed to be absolutely reliable. The generally accepted purpose of these control messages [ICMP] is to provide feedback about problems in the communication environment, not to make IP reliable. The ICMP messages typically report errors in the processing of Datagrams. To avoid the infinite regress of messages about messages etc., typically in the art no ICMP messages are sent about ICMP messages. The ICMP protocol is described in more detail in Network Working Group, RFC792, published September 1981. ICMP messages are sent using the basic IP header. The first octet of the data portion of the datagram is an ICMP type field; the value of this field determines the format of the remaining data. A representative illustration of typical layered network protocols are shown in FIG. 2, illustrating the layer 2 IP protocol which includes a field for ICMP messaging.

According to one aspect of the present invention, a new message is introduced at the ICMP protocol layer that is used by the CPSTP to provide security and trace-ability functionality. The message is the TRACE message, and incorporates existing PING- and TRACEROUTE-like functions. According to the ICMP protocol, a source device sends a PING message to identify the network configuration, i.e., which devices are coupled to the source device. For example, once a device is determined to be within the network, the PING message is routinely sent to the device. The destination device of a PING message acknowledges the PING. When the PING is received at the source device, various statistics are evaluated, including the time delay between the PING and the acknowledgement. The PING command thus allows a device to determine which other devices are in the network, and may be used, among other reasons, to re-route messages when a device goes down, or determine the fastest path to a destination.

The TRACEROUTE function has generally been used as a diagnostic tool in ICMP, for tracing the source of requests at a device to shut down spoof attacks. When a request is received at a source device, the source device may issue a TRACEROUTE command to the device that issued the request. The TRACEROUTE command then operates similar to the PING command; however, it returns statistics identifying the path to the destination address. Thus, the TRACEROUTE command may be used to establish knowledge at a source device about its network structure.

According to one aspect of the invention, the TRACE function of the CPSTP is used to provide trace-ability functionality at the network layer of a device. Providing such functionality at the network layer provides a number of distinct advantages. First, as will be seen in more detail below, it enhances network security by ensuring that some base level of authentication is provided throughout the network, not merely as at the application layer. By providing the security and trace-ability features at this level, the features are made available to all, independent of the type of content provider or the type of content. Thus, a base level of security and trace-ability functionality can be readily provided to all content providers, including large organisations and individual content providers, as well as all type of content, including both controlled and uncontrolled. Second, the CPSTP functionality can be enhanced to collect and manage billing information at the network layer. The above properties therefore make the CPSTP portal an ideal candidate for use in today's e-business solution set.

Figure 3:
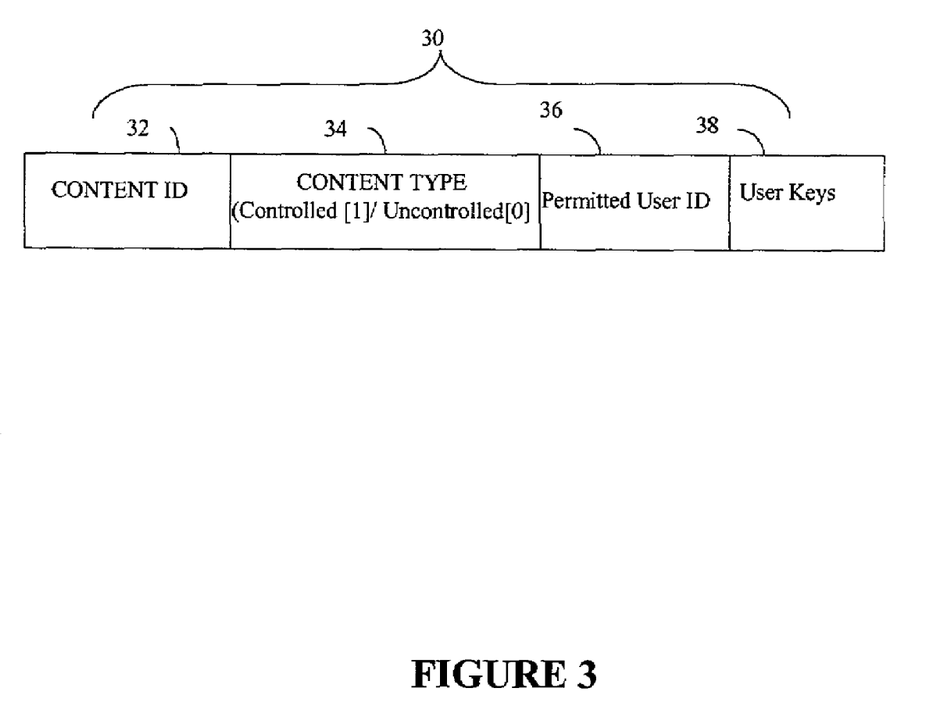
FIG. 3 illustrates exemplary entries of a data structure that may be associated with content stored on a device that utilises the Content Provider Secure Traceable Portal (CPSTP) of the present invention.

Referring now to FIG. 3, an exemplary data structure 30 that may be maintained at the CPSTP for stored content is shown. The data structure 30 includes a content identifier field 32, a content type field 34, a user identifier (ID) field 36 and a user key field 38. The content identifier field 32 may be either a value associated with the content, such as a label, hash index, or an address of the content in a stored memory device. The content type field 34 is used to determine whether or not the content is a controlled type (therefore requiring authentication for access) or an uncontrolled type (no authentication required). The user ID field 36 is used in the event that the content is controlled content, to identify users that are permitted to access the content. The user key field 38 may include one or more values, and may be used to store the certification key, password or other security information associated with the permitted user.

It should be noted that the above data structure is not a requirement of the CPSTP. Depending upon the type of stored content, it may be that no data structure is required (if all content is uncontrolled), or, depending upon the security associated with the content, it may be that greater or fewer fields, or more particular fields are required to support the chosen security model. In addition, the data structure could also include fields for billing (which may store the users credit-card number or ordering history, for example), or fields that identify use characteristics of the user (such as number of times accessing the content, types of requests). These fields enable provider of the content to sculpt the subscribers' user experience, through directed advertisement and the like. Accordingly, it should be understood that the data structure of FIG. 3 is provided for illustrative purposes only, and is not a limitation of the invention.

Figure 4:
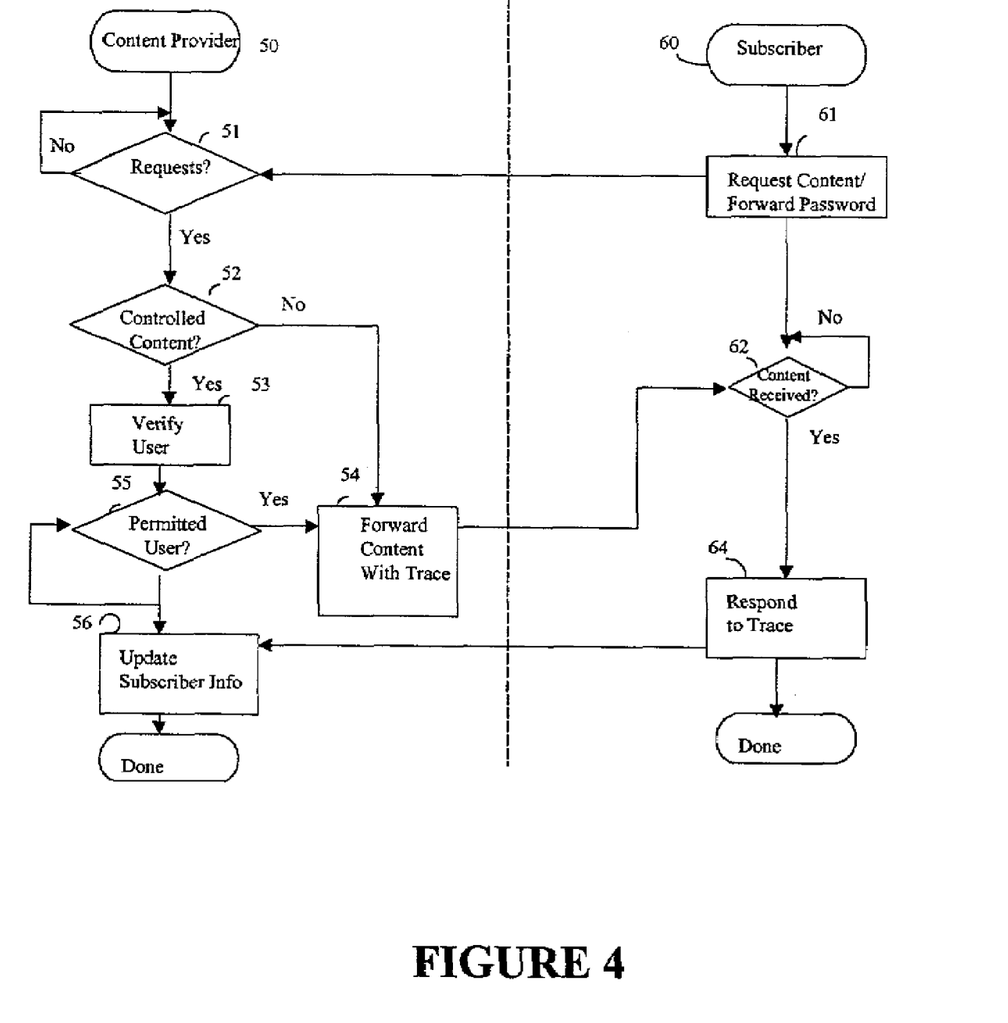
FIG. 4 is a data flow diagram illustrating the basic operative flow of the CPSTP.
Figure 5:
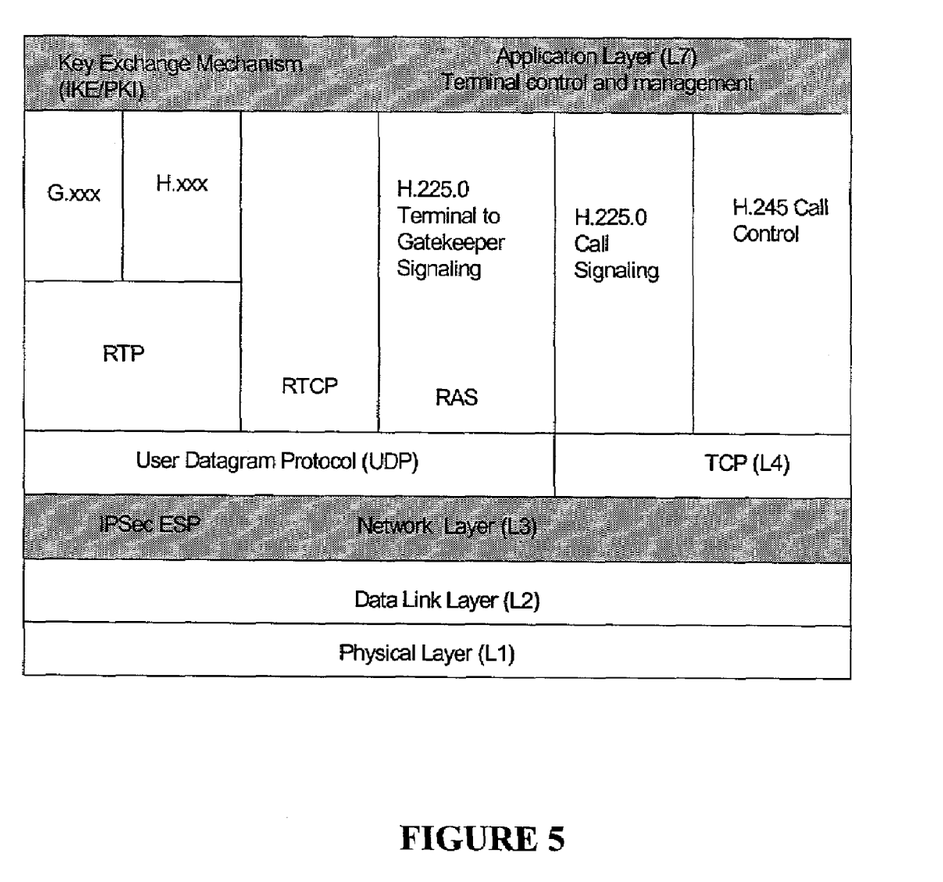
FIG. 5 is a representative diagram of fields used in the layer 3 to layer 7 protocols (Network and application layers)

Referring now to FIG. 4, a flow diagram illustrating the basic process that underlies the agility of the CPSTP will be described. FIG. 5 illustrates IPSec and IKE security functionality that may be layered onto the CPSTP functionality, and FIGS. 6-8 will then further describe additional embodiments of the CPSTP, which include security enhancements to enhance e-business operations.

For purposes of simplicity, FIG. 4 is divided into two segments, a first illustrating operations that occur at a generic content provider 50, and the second illustrating resultant operations at a generic subscriber device 60 seeking to access content. The flow diagram assumes that the source device stores both controlled and uncontrolled content (where controlled content is content that requires initial authentication of a subscriber prior to its release).

The subscriber device 60, at step 61 issues a request to the content provider 50 for content, and enters a wait state 62. When the content provider 50 receives the request, it identifies the content that is sought, and determines whether the content is controlled or uncontrolled content. The determination as to whether content is controlled or uncontrolled may be made in a variety of ways. As described above, the determination may be made by examining a bit in a data structure such as bit 34 in data structure 30 of FIG. 3. Alternatively, controlled and uncontrolled content may be stored at different segments of storage, or on different devices in the network.

If, at step 52 it is determined that the content is controlled, a number of things may occur, depending upon the level of security that is implemented at the CPSTP. In one embodiment of the CPSTP, when a request is received for controlled content, the content provider queries the subscriber for a password prior to forwarding the content. In another embodiment, the content is delivered directly to the subscriber in a pre-determined encrypted format, based on the characteristics of the subscriber.

If it is determined at step 52 that the content is not controlled, or encrypted content is sent, then at step 54 the content is provided to the subscriber. Along with the content (or along with a password request), a TRACE request is sent to the subscriber. The TRACE request is received at the subscriber and at step 64 the subscriber generates an acknowledgement response back to the content provider. The response may include a table of information including one or more statistics about the subscriber, including routing information, billing information, privileges, keys, etc. In one embodiment of the invention, at step 56 the provider may store, for each subscriber, profile information that includes all of the above retrieved information as well as a database of content accessed by the subscriber. The profile information may be used to personalise the subscribers' interface through directing advertising and e-commerce offerings.

In one embodiment of the invention, CPSTP security functions may be implemented by incorporating the standard IP Security (IPSec) protocols where appropriate. The IPSec protocols are accepted layer 3 Internet security solutions. Referring now to FIG. 5, the relationship of the IPSec protocol layer to application-level security is shown. The IP security (IPSec) is a set of protocols designed to provide interoperable, high quality, cryptographically based security for Internet Protocol version 4 and version 6 (IPv4 & IPv6) packets. The IPSec provides layer 3 privacy, authentication, and integrity; independent of the currently implementing application. IPSec uses the IP Authentication Header (AH) to provide connectionless integrity, data origin authentication, and an optional anti-reply service; and uses Encapsulating Security Payload (ESP) protocol to provide confidentiality (encryption), limited traffic flow confidentiality, and connectionless integrity, data origin authentication, and an optional anti-reply service. According to one aspect of the invention, the TRACE functionality of the CPSTP may be modified to exchange all of the IPSec information with a subscriber. With this arrangement, IP security can be implemented in a consistent manner and in-conjunction with the layer 7-security application that is executing on the content provider or the subscriber.

Various applications-level security methods are provided in the art, and IPSec does not provide application-level authentication on its own. Rather, at layer 7 (the application layer), the IKE (Internet Key Exchange) and PKI (Public Key Infrastructure) are standard key exchange mechanisms for IPSec. PKIX (Public-key Infrastructure X.509) is a standard application layer protocol. The IKE provides the authentication of the parties involved using digital signature or pre-shared keys, privacy of identities, and other functions. The PKI involves in certificates, Certificate Authorities (CA), and Certificate Revocation Lists (CRLs). The PKI is mainly used for initial authentication of devices and securing initial exchange of information before shared key is established.

The IPSec protocols support Ciphering algorithms (such as DES, 3DES, RC5, IDEA, CAST, Blowfish), Hash algorithms (such as MD5, SHA-1, Tiger), and Authentication (such as RSA digital signatures, DSS digital signatures, and Pre-shared secret key).

In addition, the Secure Socket Layer (SSL) at layer 7 is a security protocol developed by Netscape and supported by most web browsers. The SSL runs on top of transport control protocol (TCP) above layer 4. The SSL provides privacy via DES, 3DES CBC, or RC4, integrity via MD5 or SHA-1 MAC, authentication via RSA or DSS. The SSL shall be used for access via web browser where HTML, CORBA, Java, LDAP are used. The Transport Layer Security (TLS) is supported by Microsoft Internet Explorer and is backwards compatible with SSL.

The Domain Name Server Security (DNSSEC) provides authentication and integrity for DNS (Domain Name Server) responses. DNSSEC uses PKI to provide digital signatures for DNS records.

As shown above, a variety of layer 7 security applications exist in the e-business marketplace. Because the CPSTP provides information transfer functionality at layer 3, it enables certain IPSec authentication and management to be performed at layer 3. Accordingly, CPSTP offers layer 3 IPSEC and layer 7 IKE/PKI security. As a result, a secure environment for e-business commercial and financial transactions over the Internet can be maintained. In one embodiment, for CPSTP security and digital signatures implementation for end-to-end connection, the devices (including access terminals, gateway, servers, switches, and others) may incorporate IPSec protocols that support the following: Tunnel and transport modes, Authentication Header (AH) and Encapsulating Security Payload (ESP) protocols, Encryption transforms that include DES-CBC, 3DES CBC, Authentication that include RSA digital signature, DSS digital signature, and pre-shared security key, Selectors that include source IP address, Destination IP address, Transport layer protocol (UDP or TCP) and Transport Layer Protocols (UDP or TCP) port numbering.

The content provider may support any or all of the layer 7 protocols. For example, one layer 7 protocol that could be running on a Business type content provider may be IKE with the following: Authentication methods including digital signature, pre-shared keys, privacy of identities, and other functions, Encryption algorithms including DES, 3DES, Hash algorithms including MDS, SHA-1, PKI encryption and authentication with IKE (using digital signature or pre-shared keys, privacy of identities, and other functions), PKIX (Public-key Infrastructure X.509), Security (DNS-SEC) for domain name servers, and SSL/TLS for HTTP, Java, and CORBA links with two-way authentication for Web browsers' users.

Other layer 7 applications that could be executing in conjunction with the CPSTP include DNS Security (DNS-SEC) for domain name servers and SSL/TLS for HTTP, Java, and CORBA links with two-way authentication for Web browsers' users (i.e., consumers hosting content).

As mentioned with regard to FIG. 1, the CPSTP capabilities allow security and trace-ability functions to be incorporated in a variety of e-business scenarios, including Business-to-Business (B2B), Business-to-Consumer (B2C), consumer-to-business (C2B), and consumer-to-consumer (C2C) commercial and financial transactions on the integrated optical and wireless Internet. The devices may include IP host, gateway, Web server, Web switch, router, data centre, and others. The service provider management system may monitor accounting information and manage billing process for businesses and consumers.

To establish the communication links, some basic functionality may be included at the CPSTP of the content provider or customer. The exact functionality required at either the subscriber or content provider depends upon the type of transaction, but some basic functionality that may be supported by the CPSTP is described below.

The Logon Function. The CPSTP responds to a Log on request with the consumer's identifier (CPSTP.F1_Logon (consumer's identifier)) as per today's practices. A consumer's identifier could be a User identifier, IP address, URL, telephone number, cell number, or one of several other supported techniques. The Logon function would be provided in all embodiments of the CPSTP.

Figure 6:
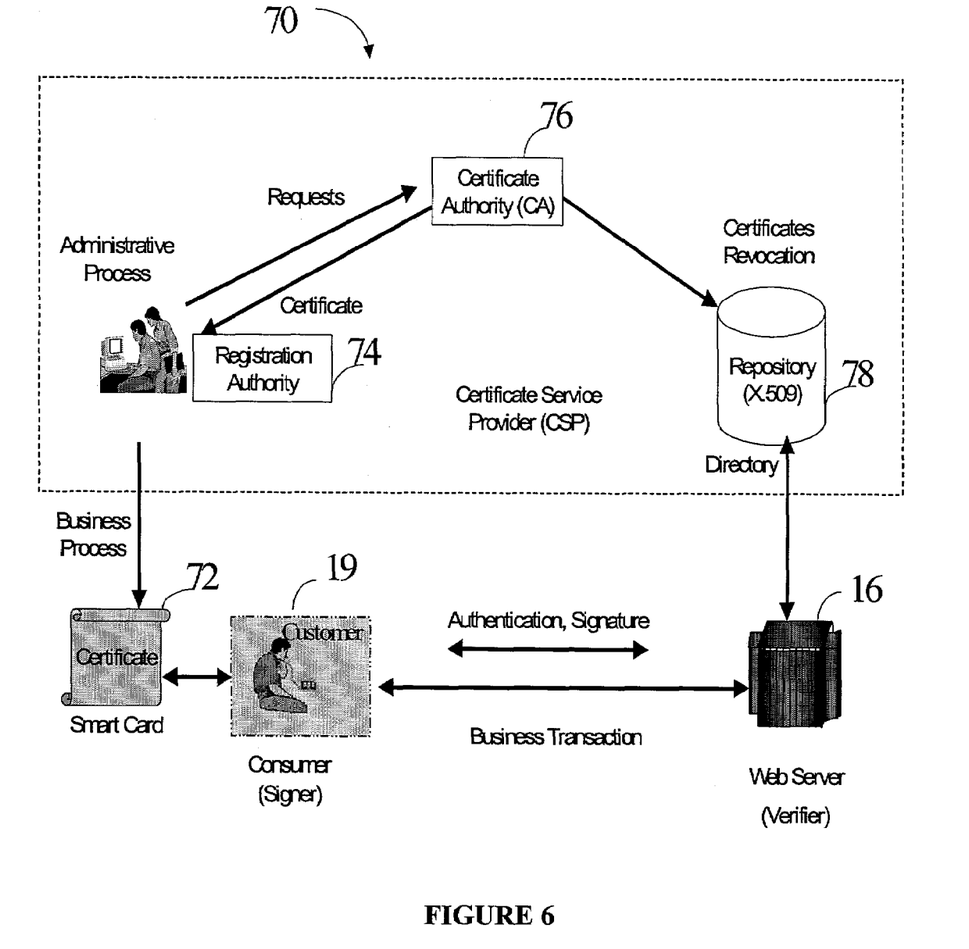
FIG. 6 is a data flow diagram for illustrating a method used to obtain certificates of authority.

The Certification of Authority Function. A Certificate Authority (CA) issues the CPSTP authentication function for a consumer's identifier, (CPSTP.F2_CA (consumer's identifier)). The Certificate of Authority function should be implemented at the devices that seek to provide controlled access to content. For illustration, -typical components that may be included in layer 7 Certificate of Authority applications are shown in FIG. 6. A Certificate Authority (CA) 76 accepts certificate applications from consumers 19, authenticates applications, issues certificates 72 and maintains status information about certificates in repository 78. The authentication mechanism prevents some theft of service, Denial-of-Service (DoS) attacks, and spoofing scenarios.

The certificate is either self signed or signed by certificate authority (CA). A self-signed certificate is less secure. The only way a consumer can verify the identity in a self signed situation is if he/she has that person's public key or certificate which was obtained in advance via some secure out-of-band mechanism. The certificate authority (CA) certifies that consumer public key is indeed his/her own. A certificate authority (CA) can be a commercial authority, but certificates can be issued by any entity that consumer trust to be an authority including his/her-self. The certificate authority (CA) signs a requesting consumer's certificate. The CPSTP CA calculates the digital signature by computing the message digest (a hash) of the certificate and encrypts the message digest with its private key. An attacker cannot forge a CA's certificate because it does not know the CA's private key and, therefore, cannot generate the correct digital signature. Additionally, if an attacker makes any changes to a genuine certificate, the message digest of the certificate changes and no longer matches the CA's signature. The X.509 certificates are an agreed upon ITU-T standard format for required information in a certificate.

The Digital Certificate (DC) Function: The CPSTP Digital Certificate (CPSTP.F3_DC (consumer's identifier, consumer's signature)) uses public/private key pairs. The DC functionality may be included in the CPSTP of the devices that seek to control access to content.

When a consumer obtains a digital certificate, it will have a public and a private key. The consumer shall keep its private key in confidence; this key is called the consumer secret key. Digital certificates provide a way to identify a device or user on the network. A digital certificate contains the consumer's public key and is signed.

In one embodiment, the Public Key consumer authentication capability verifies the parties' identities and establishes a shared secret in the following manner. First, it generates new and random key pair. Next, it computes shared secret from peer's public key and owner private key. Then, it signs keys with RSA private key and encrypt the signature with shared secret and sends encrypted signature to peer. It then decrypts signature with shared secret and verifies it with peer public RSA key and sends public key, digital certificate and encrypted signature to the peer. Next, it sends public key and digital certificate to peer and generates random key pair and computes shared secret from peer's public key and own private key. Finally, it signs keys with RSA private key and encrypts the signature with shared secret and decrypts signature with shared secret and verifies it with peer public RSA key. The trace request retrieves the digital certificate information and IKE/PKI keys info from the subscriber and the verification of the information is done in the network.

The Content Request Function. The CPSTP request for contents with a content identifier (CPSTP.F4_Request (Content's identifier)) function is similar to exiting practices for content request or downloads procedures. The content request function would be included in all embodiments of the CPSTP.

The Trace Function. The CPSTP Trace (CPSTP.F5_Trace.ICMP (consumer's identifier)) function incorporates the special purpose applications and utilities of ICMP and the existing ICMP PING- and TraceRoute-like functions. The CPSTP trace function would be included in all embodiments of the CPSTP. The trace functionality is originated and activated on the content provider's device when it received a request for the content.

The Content Transaction Function. The CPSTP content transaction function for a specified consumer's identifier and content identifier (CPSTP.F6_Content.Transaction (consumer's identifier, Content's identifier)) function is similar to existing practices for content transaction, and includes commands such as download, view, etc. The Content Transaction function would be included in all embodiments of the CPSTP.

The Content Billing Function. The CPSTP content billing function for a specified consumer's identifier and content identifier (CPSTP.F7_Content.Billing (consumer's identifier, Content's identifier)) function could take various forms such as pay per content, pay per access, pay per services, or any agreed business techniques. The CPSTP content accounting monitoring and billing process may be managed by a service provider (SP) operations support system (OSS). For example, the SP OSS interface to the devices (e.g., server, gateway, switch, router, data centre, and others) may be implemented using SNMPv3 (simple network management protocol version 3) that implements privacy via DES CBC, and authentication and integrity via MD5 or SHA-1 HMAC. The SNMPv3 interface between the device and OSS may be used to monitor the accounting and manage billing information for e-Business contents commercial and financial transactions. The CPSTP billingfunction may be provided in CPSTP instantiations that include controlled and uncontrolled access to content, that seek revenue from the content.

The Transaction Receipt Function. The CPSTP transaction receipt for a specified consumer's identifier and content identifier (CPSTP.F8_Transaction.receipt (consumer's identifier, Content's identifier)) function could be a simple notification as in the existing practices.

The Logout Function. CPSTP Log out with the consumer's identifier (CPSTP.F9_Logout (consumer's identifier)) function is as per today's typical logout practices, and effectively disconnects the subscriber from access to the content. The Logout function would be implemented in all embodiments of the CPSTP.

A brief description of each of the e-business scenarios, and how they utilise the above functionality, will now be described Business-to-Consumer (B2C)

In one embodiment of the B2C scenario, the consumer logs into the CPSTP with the customer identifier. The CPSTP executes the CA function to obtain the customer certificate and authenticate the consumer's identifier. Then, the CPSTP executes the DC function to obtain the public key from the consumer. The CPSTP receives the content request from the consumer, including the content identifier, and retrieves the content. The CPSTP executes the content transaction function (in response to the type of transaction indicated by the consumer) and returns the content to the consumer, optionally encrypted using the public key. Along with the content, the CPSTP issues the TRACE command, to collect information (such as CA, routing information, billing info, IKE, PKI, etc.) from the consumer. Once the TRACE returns the desired information, the CPSTP executes the content billing function, to calculate the charge to the consumer for the given transaction on the content. Next, the CPSTP issues the transaction receipt function to forward the receipt for the given transaction to the consumer. When the consumer completes all e-business transactions at the business, the logout function is executed at the CPSTP. In one embodiment, the logout function may delete all the information maintained at the CPSTP for the particular consumer. Alternatively, history files for various consumers may be maintained to enable the CPSTP to further characterise the consumer behaviour, and thereby perform directed advertising and service offerings.

The CPSTP Consumer-to-Business (C2B) scenario depends on the service provider offering the business. In general, all of the above functions described for the B2C scenario are executed. The content creator downloads the content to the Web server using standard protocols such as Telnet, Http, SNMP, and CORBA.

There are number of possible implementation for CPSTP Business-to-Business (B2B) scenario. If one of the businesses (could refer to it as a $3^{rd}$ party service provider (3SP) such as Dot.com) interested only in offering the contents to the consumers, then this business (3SP) could lease the CPSTP from the other business (could refer to it as Incumbent service provider such as ISP, ASP, Hosting SP, Etc.). The 3SP could also lease the resources from the other business and incorporate the CPSTP functions in its virtual private network (VPN). The communication between the businesses is dependent on the businesses service agreement.

The CPSTP Consumer-to-Consumer (C2C) scenario is a proprietary and overlay solution. The CPSTP functions described above are incorporated in the application layer (layer 7) using the secure socket layer (SSL).

Figure 7:
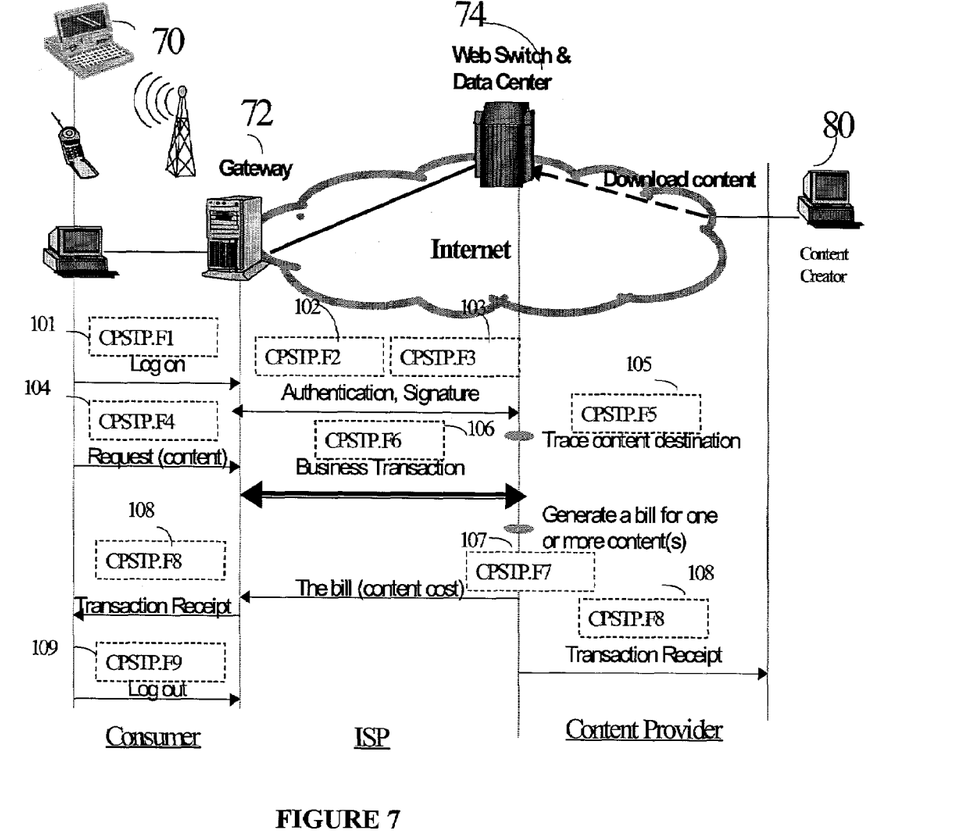
FIG. 7 is a functional flow diagram for illustrating the execution of functions in the CPSTP for transferring controlled data to a consumer.
Figure 8:
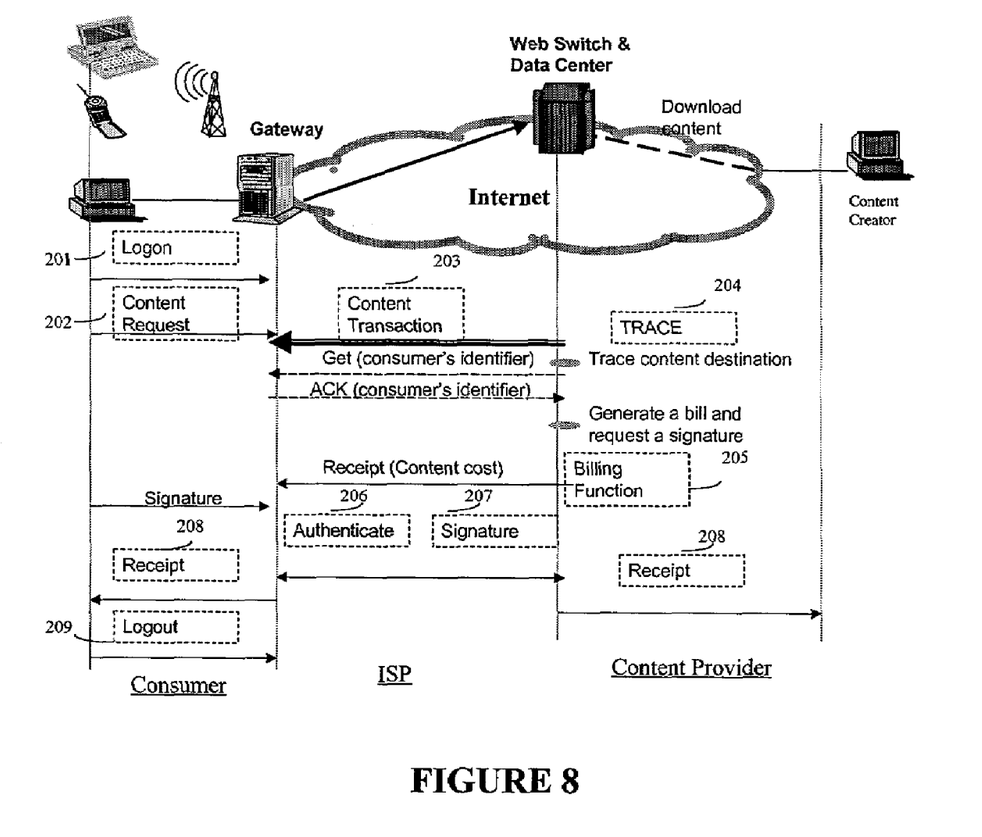
FIG. 8 is a functional flow diagram for illustrating the execution of function in the CPSTP for transferring uncontrolled data to a consumer.

Referring now to FIGS. 7 and 8, functional flow diagrams illustrating the communication between CPSTP components at various points in the Internet are shown. The functional flow diagram of FIG. 7 illustrates a command and data flow structure for a consumer request to access controlled content, and FIG. 8 illustrates the command and data flow structure for a consumer request to access uncontrolled content. The steps taken during data exchange occur in sequence from 101 (logon) to 109 (logout) in FIG. 7, and 201 to 208 in FIG. 8. Note, in FIG. 8 the authentication functionality is executed at the ISP for billing purposes only, and not to gain access to the data.

As mentioned above, although the ICMP and IPSec protocols have been discussed for illustration purposes, the present invention is not limited to any particular protocol. For example, an alternative to the IPSec encryption and authentication with IKE and PKI for CPSTP is the Wireless Application Protocols (WAP) security. The Wireless Transport Layer Security (WTLS) would provide the authentication required for CPSTP for wireless Internet.

Accordingly, a mechanism has been described that is capable of providing security and trace-ability functionality to network's devices. By providing functionality at the network layer in-conjunction with application layer (layers 3 to 7), security is enhanced by ensuring that some base level of authentication is provided throughout the network, not merely as at the application layer. By providing the security and trace-ability features at this level, the features are made available to all, independent of the type of content provider or the type of content. Thus, a base level of security and trace-ability functionality can be readily provided to all content providers, including large organisations and individual content providers, as well as all type of content, including both controlled and uncontrolled. This functionality can be enhanced to collect and manage billing information at the network layer. The above properties therefore make the CPSTP portal an ideal candidate for use in today's e-business solution set for wireless and wire-line devices.

We claim:

1. A device for storing content, the device comprising:
a processor;
a portal, executing on the processor, for interconnecting the device to a network, the portal including a computer readable device storing a network layer message that is operable when executed to retrieve authentication information from a second device, the authentication information including at least one Internet Protocol Security header field;
wherein the network layer message is automatically issued by the portal in response to a request from the second device for access to the content; and
wherein the network layer message is transmitted to the second device together with the content.

2. The device of claim 1, wherein the network is an integrated wire-less and optical Internet.

3. The device of claim 1, wherein the network layer message is a TRACE request.

4. The device of claim 1, wherein the authentication information retrieved from the second device is selected from a group comprising a user identifier, an Internet Protocol (IP) address, a password, a telephone number and cell phone number.

5. The device of claim 1, wherein the authentication information retrieved from the second device includes accounting information.

6. The device of claim 1, wherein the authentication information retrieved from the second device includes billing information.

7. The device of claim 1, wherein the authentication information that is retrieved by the network layer message is forwarded to layers 3 to 7 of the Internet Protocol.

8. The device of claim 7, wherein the network layer message is an Internet Control Message Protocol (ICMP) message that forwards the authentication information to security protocols operating at layers 3 to 7 of the Internet Protocol.

9. The device of claim 8, wherein the security protocols support at least one function selected from a group consisting of tunnel and transport modes, authentication, encapsulating security payload, encryption and digital signatures.

10. The device of claim 9, wherein the security protocol is the IPSec protocol at layer 3 with IKE/PKI keys at layer 7.

11. The device of claim 10, wherein the security protocol is the Wireless Application Protocols (WAP) security.

12. A software program, stored on a computer readable medium of a content provider device, the software program operable when executed to control access to content stored on the content provider device, the software program including:
a network layer instruction, executed in response to a request from a requesting device for content stored at the content provider device, and operable when executed to automatically retrieve authentication information from the requesting device to verify that the requesting device may access the content, the authentication information including at least one Internet Protocol Security header field, wherein the content is transmitted with the network layer instruction to the requesting device when the requested content is of a type selected from a group including encrypted content and uncontrolled content.

13. The software program of claim 12, wherein the software program further comprises a data structure, associated with the content, for storing characteristics about the content, including information associated with the requesting device that has been sent the content, and wherein the data structure is populated by information returned in response to the network layer instruction.

14. The software program of claim 12, wherein the network layer instruction is further operable when executed to forward a table to the requesting device to retrieve characteristics of the requesting device.

15. The software program of claim 12, further including means for billing the requesting device for access to the content.

16. The software program of claim 12, further including security protocols to support at least one function selected from a group comprising tunnel and transport modes, authentication, encapsulating security payload, encryption and digital signatures.

17. The device of claim 16, wherein the security protocol incorporates the IPSec protocol at layer 3 and SSL at layer 7.

18. The device of claim 16, wherein the security protocol is the Wireless Application Protocols (WAP) security.

19. A content secure traceable portal software program code module, stored in a computer readable medium of a device for use in controlling access to content at the device, comprising:

program code operable when executed to execute the Internet Protocol (IP);

program code operable when executed to execute the Internet Control Message Protocol (ICMP) comprising diagnostic protocols including an ICMP TRACE function for retrieving authentication information from a device seeking access to the content by sending an ICMP message to the device together with the content when the content is provided to the device seeking access to the content, the authentication information including at least one Internet Protocol Security header field;

program code operable when executed to execute software security protocols that support at least one of the following: Tunnel and transport modes, Authentication Header (AH) and Encapsulating Security Payload (ESP) protocols, Encryption transforms that include DES-CBC, 3 DES CBC, Authentication that include RSA digital signature, DSS digital signature and pre-shared security key, Selectors that include source IP address, Destination IP address, Transport layer protocol (UDP or TCP) and Transport Layer Protocols (UDP or TCP) port numbering; and Authentication software protocols including digital signature, pre-shared keys, privacy of identities, Encryption functionality and Hash functionality.

20. The content secure traceable portal of claim 19, wherein the software security protocol is the layers 3 to 7 standard protocols.

21. The content secure traceable portal of claim 19, wherein the software security protocol is the Wireless Application Protocols (WAP).

22. A method of controlling access, by a requesting device, to content stored at content providing device, the method comprising the steps of, at the content providing device:

receiving a request for access to the content from the requesting device;

forwarding a network layer message to the requesting device to retrieve authentication information from the requesting device, the authentication information including at least one internet protocol security header field; and determining a characteristic of the requested content and selectively forwarding the requested content to the requesting device in response to the characteristic indicating that the requested content is of a type selected from a group including encrypted content and uncontrolled content, and wherein the network layer message is forwarded together with the requested content.

23. The method according to claim 22, wherein the content is uncontrolled content and the method further comprises the step of requesting a return signature from the requesting device when content is forwarded to the requesting device to indicate receipt of the content at the requesting device.

24. The method according to claim 22, further comprising the step of forwarding a table with the network layer message to obtain accounting information from the requesting device.

25. The method according to claim 24, further comprising the step of issuing a receipt to the requesting device to indicate billing of the requesting device for access to the content.

26. The method according to claim 22, wherein the characteristic of the content indicates that the content is controlled content, and further including the steps of: Prior to forwarding the content to the requesting device: Obtaining a certificate of authority (CA) for the requesting device; Obtaining a digital signature for the requesting device; and Responsive to the certificate of authority and the digital signature indicating that the requesting device may access the content, forwarding the content together with the network layer message to the requesting device.

* * * * *